United States Patent
Marks et al.

(10) Patent No.: US 8,253,801 B2
(45) Date of Patent: Aug. 28, 2012

(54) CORRECTING ANGLE ERROR IN A TRACKING SYSTEM

(75) Inventors: Richard Lee Marks, Pleasanton, CA (US); Eric Larsen, Foster City, CA (US)

(73) Assignee: Sony Computer Entertainment Inc., Tokyo (JP)

(*) Notice: Subject to any disclaimer, the term of this patent is extended or adjusted under 35 U.S.C. 154(b) by 531 days.

(21) Appl. No.: 12/435,285

(22) Filed: May 4, 2009

(65) Prior Publication Data
US 2010/0149341 A1    Jun. 17, 2010

Related U.S. Application Data

(60) Provisional application No. 61/138,516, filed on Dec. 17, 2008.

(51) Int. Cl.
*H04N 5/225* (2006.01)
(52) U.S. Cl. .......... 348/169; 382/102; 382/107
(58) Field of Classification Search .......... 348/169; 382/107, 103
See application file for complete search history.

(56) References Cited

U.S. PATENT DOCUMENTS

| | | | |
|---|---|---|---|
| 4,787,051 A | 11/1988 | Olson | |
| 4,843,568 A | 6/1989 | Krueger | |
| 5,128,671 A | 7/1992 | Thomas, Jr. | |
| 5,297,061 A | 3/1994 | Dementhon et al. | |
| 5,454,043 A | 9/1995 | Freeman | |
| 5,528,265 A | 6/1996 | Harrison | |
| 5,616,078 A | 4/1997 | Oh | |
| 6,157,368 A | 12/2000 | Fager | |
| 6,375,572 B1 | 4/2002 | Masuyama | |
| 7,158,118 B2 | 1/2007 | Liberty | |
| 7,239,301 B2 | 7/2007 | Liberty et al. | |
| 7,262,760 B2 | 8/2007 | Liberty | |
| 7,414,611 B2 | 8/2008 | Liberty | |
| 7,421,369 B2 * | 9/2008 | Clarkson | 702/150 |
| 7,489,298 B2 | 2/2009 | Liberty et al. | |
| 7,489,299 B2 | 2/2009 | Liberty et al. | |
| 2002/0036779 A1 | 3/2002 | Kiyoi et al. | |
| 2002/0085097 A1 | 7/2002 | Colmenarez et al. | |
| 2002/0131052 A1 | 9/2002 | Emery et al. | |

(Continued)

FOREIGN PATENT DOCUMENTS

EP     0 587 138 A2     3/1994

(Continued)

OTHER PUBLICATIONS

PCT International Search Report and Written Opinion for International Application No. PCT/US10/36697, mailed Aug. 17, 2010, 8 pages. (P008PCT).

(Continued)

*Primary Examiner* — Abdullahi Salad
(74) *Attorney, Agent, or Firm* — Blakely, Sokoloff, Taylor & Zafman LLP

(57) ABSTRACT

To correct an angle error, acceleration data is received corresponding to a tracked object in a reference frame of the tracked object. Positional data of the tracked object is received from a positional sensor, and positional sensor acceleration data is computed from the received positional data. The acceleration data is transformed into a positional sensor reference frame using a rotation estimate. An amount of error between the transformed acceleration data and the positional sensor acceleration data is determined. The rotation estimate is updated responsive to the determined amount of error.

36 Claims, 12 Drawing Sheets

U.S. PATENT DOCUMENTS

| | | |
|---|---|---|
| 2002/0131056 A1 | 9/2002 | Fujii et al. |
| 2002/0181802 A1* | 12/2002 | Peterson .................. 382/284 |
| 2003/0233870 A1 | 12/2003 | Mancevski |
| 2004/0212589 A1 | 10/2004 | Hall et al. |
| 2004/0233461 A1 | 11/2004 | Armstrong et al. |
| 2005/0088419 A1 | 4/2005 | Lapstun et al. |
| 2005/0261073 A1* | 11/2005 | Farrington et al. .......... 473/221 |
| 2006/0036947 A1 | 2/2006 | Jelley et al. |
| 2006/0252475 A1* | 11/2006 | Zalewski et al. ................ 463/1 |
| 2006/0274032 A1* | 12/2006 | Mao et al. .................. 345/156 |
| 2006/0284979 A1 | 12/2006 | Clarkson |
| 2007/0211050 A1 | 9/2007 | Ohta |
| 2008/0061949 A1 | 3/2008 | Ferguson et al. |
| 2008/0080789 A1* | 4/2008 | Marks et al. ................ 382/296 |

FOREIGN PATENT DOCUMENTS

| | | |
|---|---|---|
| GB | 2 345 538 A | 7/2000 |
| GB | 2 388 418 A | 11/2003 |
| WO | WO 02/27453 A2 | 4/2002 |
| WO | WO 2008/056180 | 5/2008 |

OTHER PUBLICATIONS

Bolt, R.A., "Put-that-there": voice and gesture at the graphics interface, Computer Graphics, vol. 14, No. 3 (ACM SIGGRAPH Conference Proceedings) Jul. 1980, pp. 262 270.

Dewitt, Thomas and Edelstein, Phil, "Pantomation: A System for Position Tracking," Proceedings of the 2nd Symposium on Small Computers in the Arts, Oct. 1982, pp. 61-69.

Frank Dietrich, "Real Time Animation Techniques With Microcomputers," Pixel Creations, Chicago, Illinois, Oct. 1982, pp. 71-74.

PCT International Search Report and Written Opinion for International Application No. PCT/US09/55779, mailed Oct. 19, 2009, 11 pages.

PCT International Search Report and Written Opinion for PCT/US09/50312, mailed Nov. 10, 2009, 8 pages.

* cited by examiner

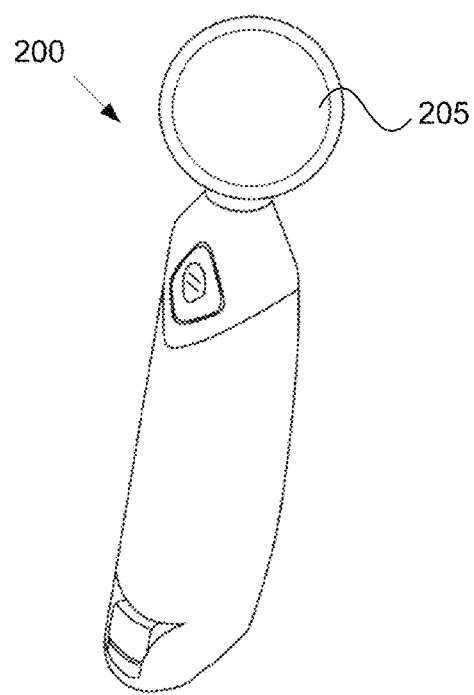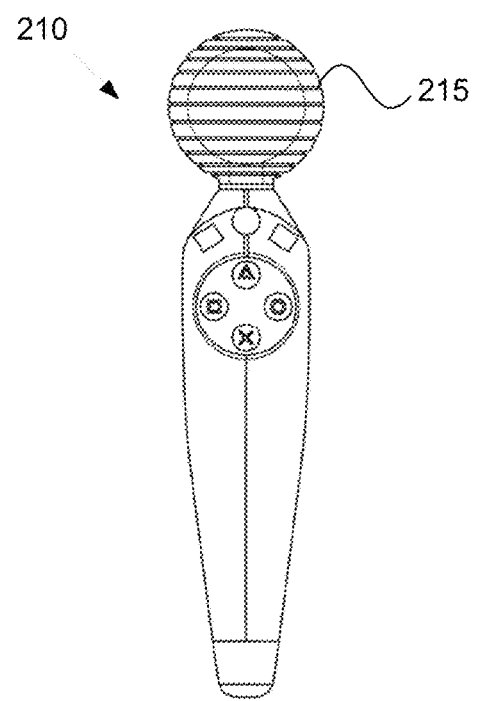
Figure 2A                  Figure 2B

CORRECTING ANGLE ERROR IN A TRACKING SYSTEM

RELATED APPLICATIONS

This application claims the benefit of U.S. Provisional Application No. 61/138,516, filed Dec. 17, 2008, which is hereby incorporated by reference.

This application is related to co-pending U.S. patent application Ser. No. 12/435,386, entitled, "TRACKING SYSTEM CALIBRATION WITH MINIMAL USER INPUT", filed on May 4, 2009.

FIELD OF THE INVENTION

The present invention relates generally to a tracking system, and more particularly to compensating for errors in the angles of the tracking system.

DESCRIPTION OF THE RELATED ART

A growing trend in the computer gaming industry is to develop games that increase the interaction between a user and a gaming system. One way of accomplishing a richer interactive experience is to use game controllers whose movement is tracked by the gaming system in order to track the player's movements and use these movements as inputs for the game. Generally speaking, gesture input refers to having an electronic device such as a computing system, video game console, smart appliance, etc., react to some gesture captured by a video camera or other positional sensor that tracks an object.

Typically, in order to produce reliable measurements of the location and motion of the user, the gaming system needs to be calibrated. Such calibration is commonly necessary each time the gaming system is used. The calibration process determines initial values for angles (e.g., yaw, pitch, and roll) of the controller in relation to the positional sensor. Since a user typically moves the controller frequently, and these movements are variable with many different accelerations, these initial angles may need to be updated frequently. These updated angles may be estimated by integrating angular rate measurements from inertial sensors on the controller. However, a slight error is introduced each time this integration is performed. Thus, over time, the values for the angles will drift, leading to a certain amount of angle error.

In certain circumstances, the pitch and roll angles may be determined absolutely by measuring the direction of gravity when the controller is not accelerating. Magnetometers may be used to determine absolute yaw angle, but magnetometers are affected by metal and magnetic interference.

BRIEF DESCRIPTION OF THE DRAWINGS

The invention may best be understood by reference to the following description taken in conjunction with the accompanying drawings in which:

FIG. 2A illustrates a game controller having a ball section, in accordance with one embodiment of the present invention;

FIG. 2B illustrates another game controller having a ball section, in accordance with another embodiment of the present invention;

DETAILED DESCRIPTION

Figure 1:
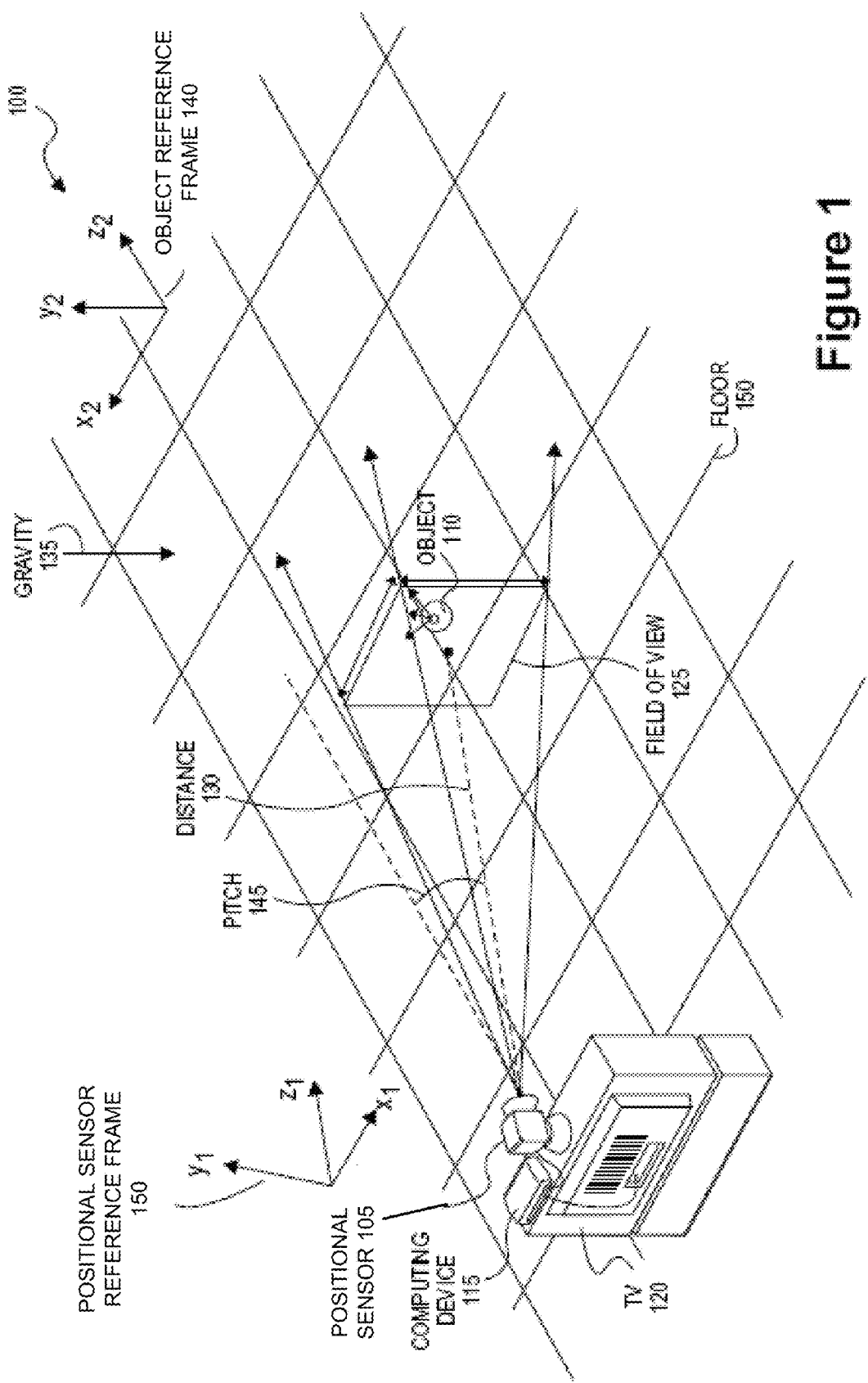
FIG. 1 illustrates a perspective view of a tracking system, in accordance with one embodiment of the present invention.

Described herein is a method and apparatus for correcting angle errors in a tracking system for use in a gaming system. In one embodiment of the invention, to correct an angle error, acceleration data is received corresponding to a tracked object in a reference frame of the tracked object. Positional data of the tracked object is received from a positional sensor, and positional sensor acceleration data is computed from the received positional data. The acceleration data is transformed into a positional sensor reference frame using a rotation estimate. An amount of error between the transformed acceleration data and the positional sensor acceleration data is determined. The rotation estimate is updated responsive to the determined amount of error.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "converting", "reconciling", "determining" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. In one embodiment, the apparatus for performing the operations herein includes a game console (e.g., a Sony Playstation®, a Nintendo Wii®, a Microsoft Xbox®, etc.). A computer program may be stored in a computer readable storage medium, such as, but not limited to, any type of disk including floppy disks, optical disks (e.g., compact disc read only memory (CD-ROMs), digital video discs (DVDs), Blu-Ray Discs™, etc.), and magnetic-optical disks, read-only memories (ROMs), random access memories (RAMs), EPROMs, EEPROMs, magnetic or optical cards, or any type of media suitable for storing electronic instructions.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

FIG. 1 illustrates a perspective view of a tracking system 100, in accordance with one embodiment of the present invention. The tracking system 100 includes a positional sensor 105, an object 110 that is tracked by the positional sensor 105, and a computing device 115 that processes data received by the positional sensor 105 and by the object 110. In one embodiment, the tracking system 100 is a component of a gaming system. Alternatively, the tracking system 100 may be a component of a motion capture system.

The positional sensor 105 is a sensor that measures positions of the object 110 in two-dimensional or three-dimensional space relative to the positional sensor 105. The positional sensor 105 may be a video camera, a Z-camera, a stereo camera, a web camera, an ultrasonic sensor array, a photonic detector, or other device capable of measuring the position of the object 110. For example, if the positional sensor 105 is a camera, the positional sensor 105 generates a plurality of images including the object 110 as it is moved.

Positional measurements taken by the positional sensor 105 are in a reference frame 150 of the positional sensor 105 that is defined by a positional sensor measurement plane and a vector normal to the positional sensor measurement plane. A reference frame is defined herein as a coordinate system within which to measure an object's position, orientation and other properties. The terms reference frame and coordinate system are used interchangeably throughout this application.

As shown, the positional sensor 105 is positioned on top of a television set 120, with a negative pitch 145 relative to a floor 150. The pitch 145 is an angle between a horizontal axis of the positional sensor's reference frame 150 that is in the measurement plane of the positional sensor 105 and a plane perpendicular to gravity 135. As long as the pitch 145 is a non-zero value, the positional sensor 105 has a reference frame 150 that is different from a world reference frame 140 (defined as a reference frame that has an axis (e.g., $y_2$) aligned with gravity 135).

In one embodiment of the invention, the positional sensor 105 is a standard video camera. In such an embodiment, the positional sensor 105 may capture depth information (distance 130 between the positional sensor 105 and the object 110) based on predefined information that identifies a size of the object 110 and/or based on predefined information that identifies a field of view (FOV) 125 of the positional sensor 105. The field of view 125 is the angular extent of a given scene imaged by the positional sensor 105. The field of view defines the distortion (e.g., amount of zoom) of an image caused by a camera lens. As the object 110 is moved further from the positional sensor 105 (that is, as the distance 130 is increased), an image of the object 110 as captured by the positional sensor 105 becomes smaller. Therefore, the distance 130 of the object 110 to the positional sensor 105 can be determined based on a ratio of the image size of the tracked object 110 (e.g., as measured in pixels) to a known actual size of the tracked object 110 provided that a field of view 125 of the positional sensor 105 is known.

In another embodiment of the invention, the positional sensor 105 is a Z-camera (a single lens video camera capable of capturing video with depth information) or a stereo camera (video camera with 2 or more lenses that can capture three-dimensional images). In such an embodiment, the positional sensor 105 can capture depth information without being preconfigured with information identifying a size of the object 110.

In yet another embodiment of the invention, the positional sensor 105 is a sensor array such as an ultrasonic sensor array or a photonic detector. Such a positional sensor 105 detects the distance between the positional sensor 105 and the object 110 using time of flight or phase coherence (e.g., of light or sound), and detects vertical and horizontal positions of the object 110 using triangulation.

Figure 2C:
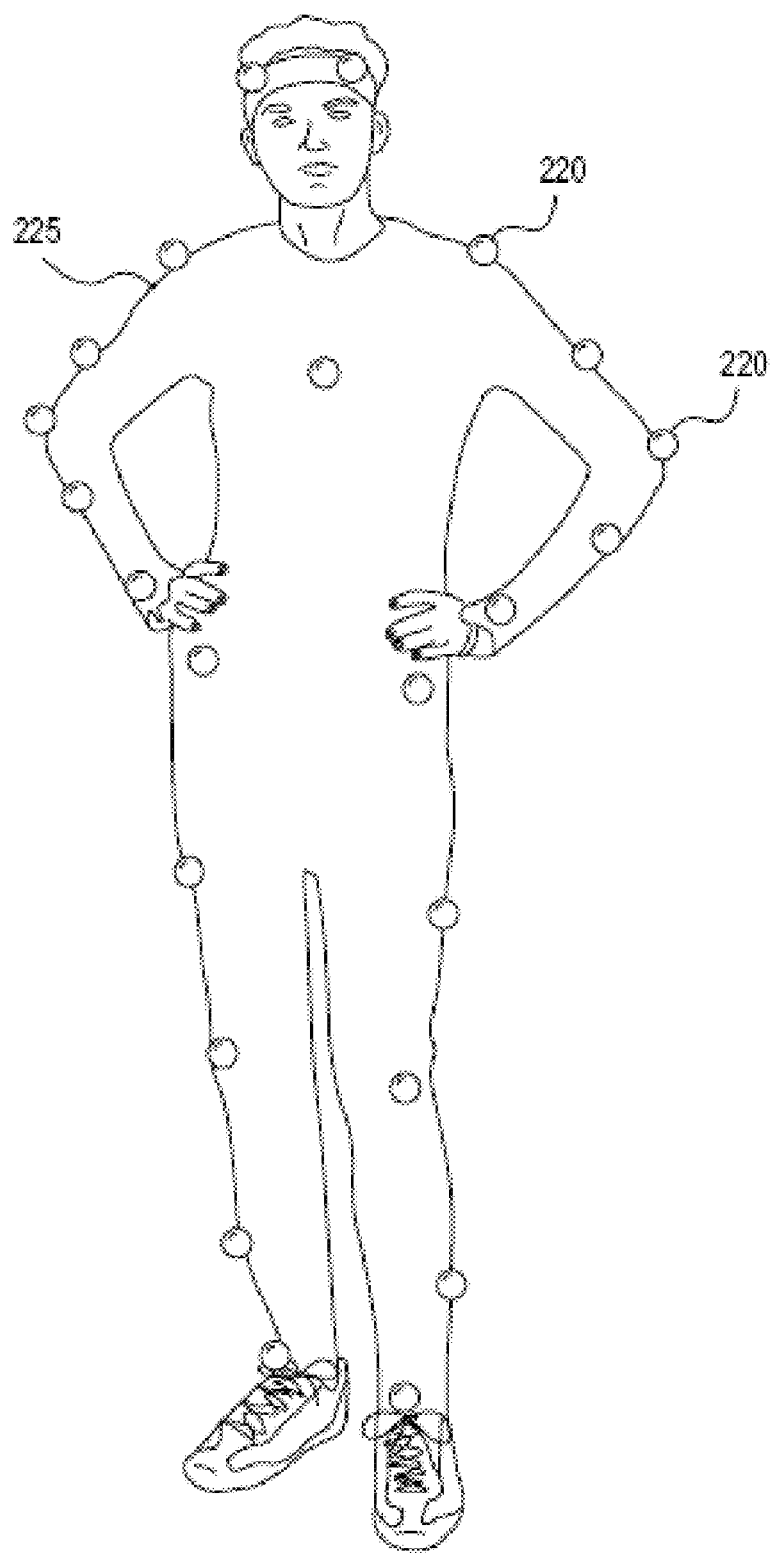
FIG. 2C illustrates multiple motion capture balls disposed on a user, in accordance with one embodiment of the present invention.

The object 110 is an electronic device that includes one or more inertial sensors. The inertial sensors may measure accelerations along a single axis or multiple axes, and may measure linear as well as angular accelerations. In one embodiment, the object 110 is a hand held electronic device or a portion of a handheld electronic device such as a game controller, as shown in FIGS. 2A and 2B. In another embodiment, the object 110 is a motion capture (mocap) ball, as shown in FIG. 2C. The object 110 may have an arbitrary shape, such as a square, sphere, triangle, or more complicated shape. In one embodiment, the object 110 has a spherical shape.

FIG. 2A illustrates a game controller 200 having a ball section 205, in accordance with one embodiment of the present invention. FIG. 2B illustrates another game controller 210 having a ball section 215, in accordance with another embodiment of the present invention. In certain embodiments, the ball sections 205 and 215 correspond to object 110 of FIG. 1.

The ball sections 205, 215 can be of different colors, and in one embodiment, the ball sections 205, 215 can light up. Although a spherical ball section is illustrated, the ball sections 205, 215 can have other shapes for visual tracking purposes, such as a partial sphere, an imperfect sphere, an elongated ball (like one used in American football or in rugby), a cube-like shape, etc. In one embodiment, the ball section 205, 215 is 4 cm. in diameter. However, other larger or smaller sizes are also possible. Larger sizes help with visual recognition. For example, a ball with a 5 cm. diameter can provide about 55 percent more pixels for image recognition than a 4 cm. ball.

FIG. 2C illustrates multiple mocap balls 220 disposed on a user 225, in accordance with one embodiment of the present invention. Mocap balls 220 are markers that are worn by a user 225 near each joint to enable a positional sensor to capture and identify the user's motion based on the positions or angles between the mocap balls 220. In one embodiment, the mocap balls 220 are attached to a motion capture suit.

Returning to FIG. 1, object 110 and positional sensor 105 are connected with computing device 115 through wired and/or wireless connections. Examples of wired connections include connections made via an IEEE 1394 (firewire) cable, an ethernet cable, and a universal serial bus (USB) cable, etc. Examples of wireless connections include wireless fidelity (WiFi™) connections, Bluetooth® connections, Zigbee® connections, and so on. In the illustrated embodiment, object 110 is wirelessly connected with computing device 115 and positional sensor 105 is connected with computing device 115 via a wired connection.

Computing device 115 may be a video game console, a personal computer, a game kiosk, or other computing apparatus. Computing device 115 may execute games or other applications that can respond to user input from object 110. The object 110 is tracked, and motion of the object 110 provides the user input.

Before the tracking system 100 can accurately track the object 110, the tracking system 100 needs to be calibrated. For example, calibrating the tracking system 100 may include computing a pitch 145 of the positional sensor 105 and computing a relative yaw between the positional sensor 105 and the object 110. The relative yaw between the object 110 and the positional sensor 105 represents the differences in heading between the object 110 and the positional sensor 105. In one embodiment, zero yaw is defined as being achieved between the positional sensor 105 and the object 110 when the object is pointed perpendicular to an imaging plane of the positional sensor 105. Alternatively, zero yaw may be defined as being achieved when the object 110 is pointed directly toward the positional sensor 105. If the positional sensor 105 is a camera with an unknown field of view 125, calibrating the tracking system 100 also includes computing the field of view 125 of the positional sensor 105. If the object 110 has an unknown size, calibrating the tracking system 100 may also include determining the size of the object 110.

In order for the inertial sensor disposed in the object 110 to gather sufficient inertial data for calibration, the object 110 should be moved by a user. The object 110 should be moved within the frame of view 125 of the positional sensor 105 to ensure that each inertial data measurement has a corresponding position measured by the positional sensor 105. An effectiveness of the calibration can be increased if the object 110 is moved through a path within the field of view 125 of the positional sensor 105 such that it exceeds a minimum threshold and occurs in at least two dimensions (e.g., a plane). The path may include movement towards and/or away from the positional sensor 105. As will be described later herein, inertial data corresponding to the object 110 is also required when correcting for angle errors in the tracking system.

Received inertial data has an uncertainty that is defined by an amount of signal noise that accompanies the inertial data. As the magnitude of accelerations measured by the object 110 decreases, a signal to noise ratio (ratio of a signal power to the noise power corrupting the signal) increases. A decrease in the signal to noise ratio causes the inertial data to become less accurate. In one embodiment, the minimum acceleration threshold is set to prevent the inertial data from falling below a minimum signal to noise ratio.

Figure 3:
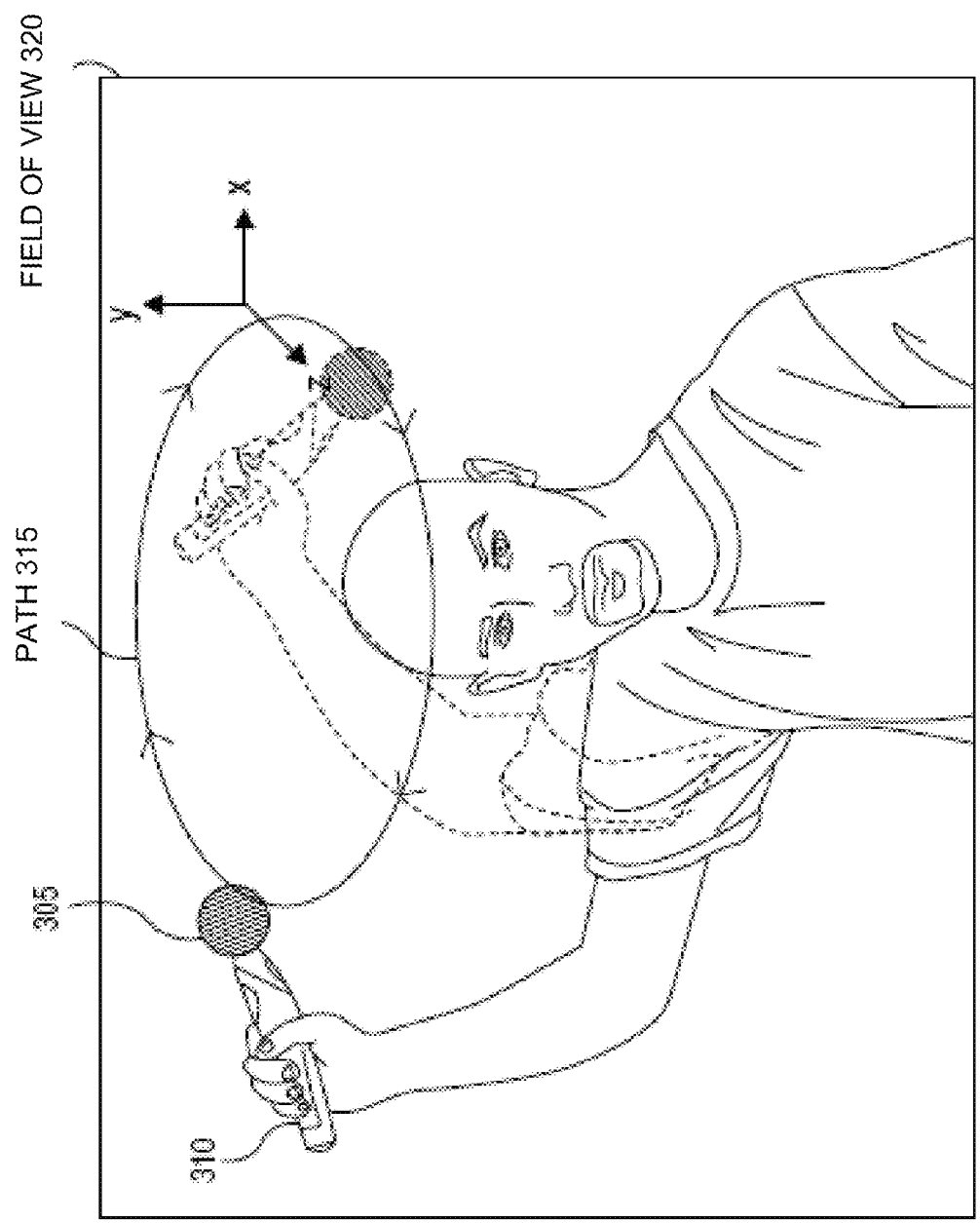
FIG. 3 illustrates an example of an object being moved through a path, in accordance with one embodiment of the present invention.

An example of an object being moved through a path in accordance with one embodiment of the present invention is illustrated in FIG. 3. As shown, the object is a ball 305 attached to the end of a game controller 310 and the path 315 is a circular path about a user's head. Circular paths are advantageous in that movement in a circle provides constant acceleration. Therefore, a circular path provides increased inertial data. The entire path 315 occurs within a field of view 320 of a positional sensor, and includes motion toward and away from the positional sensor.

Figure 4:
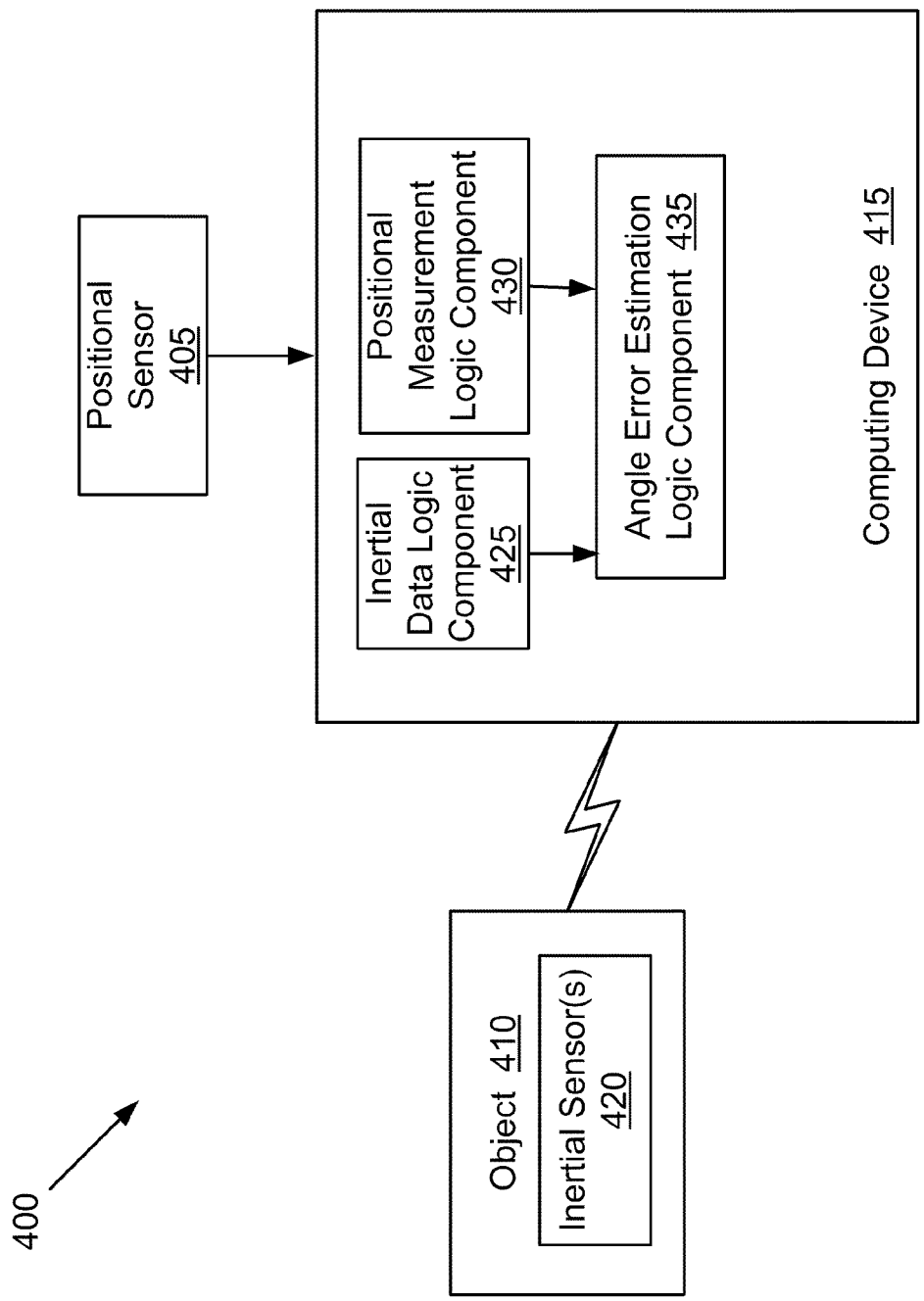
FIG. 4 illustrates a block diagram of a tracking system, in accordance with one embodiment of the present invention.

FIG. 4 illustrates a block diagram of a tracking system 400, in accordance with one embodiment of the present invention. The tracking system 400 includes a computing device 415 physically connected with a positional sensor 405 and wirelessly connected with an object 410 that is tracked by the positional sensor 405. Of course, it should be understood that in some embodiments of the invention the positional sensor 405 is wirelessly connected with the computing device 415. In one embodiment, the tracking system 400 corresponds to tracking system 100 of FIG. 1.

In one embodiment of the invention the object 410 includes one or more inertial sensors 420 in a fixed position within the object 410, however, in alternative embodiments of the invention the inertial sensor(s) 420 are outside of the object 410 (e.g., within a controller coupled with the object 110). In one embodiment, the inertial sensors 420 include one or more gyroscopes and one or more accelerometers. Gyroscopes use principals of angular momentum to detect changes in orientation (e.g., changes in pitch, roll and twist). Accelerometers measure accelerations along one or more axes. The gyroscope and accelerometer may be separate sensors, or may be combined into a single sensor. In one embodiment, the gyroscope and accelerometer are micro-electromechanical systems (MEMS) devices. As the object 410 is moved, the inertial sensors 420 gather inertial data corresponding to the object 410 (e.g., acceleration data) and transmit the data to the computing device 415. Inertial data gathered by the inertial sensors 420 is in a reference frame of the object 410.

As the object 410 is moved, the positional sensor 405 captures positional measurements of the object 410 that may include image size and image location information. For example, in the case the positional sensor is a camera, the positional sensor 405 generates a plurality of images of the object 410 while the object is moved (of course, it should be understood that in one embodiment of the invention, the positional sensor 405 generates images of the object 410 regardless of whether the object 410 is being moved). The positional sensor 405 then transmits the positional measurements to the computing device 415. In one embodiment, the positional sensor 405 streams the positional measurements to the computing device 415 in real time as the measurements are captured.

In one embodiment of the invention, as the object 410 is tracked by the positional sensor 405, changing positions of the object 410 are used as an input to the computing device 415 to control a game, computer application, etc. For example, changing positions of the object 410 can be used to control a character in a first person or third person perspective game, to move a mouse cursor on a screen, and so on. In another embodiment, the inertial data received from the object 410 is used as an input to the computing device 415. Alternatively, the inertial data may be used in combination with the positional measurement data obtained by the positional sensor 405 to provide a precise and accurate input for the computing device 415.

The computing device 415 may be a video game console, personal computer, game kiosk, etc. In one embodiment of the invention, the computing device 415 includes an inertial data logic component 425, a positional measurement logic component 430 and an angle error estimation logic component 435, each of which performs different operations.

Positional measurement logic component 430 analyzes positional measurement data (e.g., images) received from the positional sensor 405 to find the position of the object 410 (e.g., in the positional sensor reference frame 150). For example, if the positional sensor 405 is a digital camera, the positional measurement logic component 430 analyzes images received to find the object 410 in the images. In one embodiment of the invention, an image location of the object 410 is determined by analyzing a pixel group that represents the object 410 in the image to find the object's centroid. In one embodiment, a Gaussian distribution of each pixel can be calculated and used to provide sub-pixel accuracy of the centroid location.

In one embodiment of the invention, the positional measurement logic component 430 converts the positional location information to a three dimensional coordinate system of the positional sensor 405. The positional measurement locations may be converted to the three dimensional coordinate system using the following equations:

$$X_w = \frac{X_i \cdot Z_w}{f} \quad \text{(equation 1)}$$

$$Y_w = \frac{Y_i \cdot Z_w}{f} \quad \text{(equation 2)}$$

$$Z_w = \frac{f \cdot R}{2r} \quad \text{(equation 3)}$$

where $X_w$ is the horizontal position in the object reference frame, $Y_w$ is the vertical position in the object reference frame, $X_i$ is the horizontal position, $Y_i$ is the vertical position, $Z_w$ is the distance between the positional sensor and the object, f is the focal length of the positional sensor (a value proportional to the field of view), R is the size of the object (e.g., radius of a sphere in mm), and r is the size of the object (e.g., radius of a projection of the sphere in pixels).

Once the positional measurement data is converted into the three dimensional coordinate system, the positional measurement logic component 430 takes a second derivative of the location information with respect to time to compute an acceleration of the object 410 in the three dimensional coordinate system of the positional sensor 405 based on changing positions of the object 410 over time. The positional measurement logic component 430 then provides the computed positional sensor acceleration data to the angle error estimation logic component 435.

The inertial data logic component 425 processes the inertial data. In one embodiment of the invention, for each angle to be corrected, the inertial data logic component 425 removes an acceleration caused by gravity from the inertial data, and transforms the remaining acceleration from the frame of reference of the object 410 to the frame of reference of the positional sensor 405 using a rotation estimate for that angle. The resulting data (in its transformed state) is passed to the angle error estimation logic component 435. According to one embodiment of the invention, the rotation estimate is based on the previously determined value of the angle. For example, the first time the error correction process is performed, the rotation estimate is based on the initial value for the angle.

In one embodiment of the invention, the transformation of the inertial data from the object's frame of reference to the positional sensor's frame of reference is performed only if the inertial data received meets a certain threshold (e.g., the data has a magnitude greater than a predetermined noise floor). If the inertial data does meet that certain threshold, the transformation will not take place and the error correction process will not continue.

In one embodiment of the invention, the received inertial data is weighted based on the magnitude of that inertial data. For example, the accuracy of any error correction generally increases as the magnitude of received acceleration data increases. Thus, larger magnitudes of received acceleration data received from the object 410 (via the inertial sensor(s) 420) are weighted more than lower magnitudes of received acceleration data.

The angle error estimation logic component 435 compares the computed acceleration from the positional sensor logic component 430 with the inertial data from the inertial data logic component 425 to estimate the amount of error in an angle (e.g., yaw angle of the tracked object 410 relative to the positional sensor 405, pitch angle, or roll angle) in the tracking system 400. It should be understood that each angle has an initial value (e.g., computed during a calibration of the tracking system, etc.). For example, in the case of correcting for yaw angle drift, the pitch of the positional sensor 405 is known and an initial relative yaw between the positional sensor 405 and the tracked object 410 has been determined. Since a user typically moves the tracked object 410 frequently, and these movements are variable with many different accelerations, these initial angles need to be frequently updated. In one embodiment of the invention, an updated angle may be estimated by integrating angular rate measurements from the inertial sensor(s) 420. For example, in the case of the yaw angle, the yaw angle of the tracked object 410 may be continually computed by integrating data from the inertial sensor(s) 420. However, each time this integration is performed, there is a slight error. Thus, over time, the yaw angle value will drift. Thus, the yaw angle starts as known (the initial yaw angle) but will drift over time. As another example, in the cause of tilt (pitch and roll angles), the tilt of the object 410 may be continually determined from gravity if the object 410 is held still for a certain amount of time (e.g., typically less than a second). However, if the object 410 is not moved (e.g., a user does not move a game controller coupled with the object 410 for a certain amount of time) tilt may not be determined from gravity.

The transformed inertial data can be represented by a first set of vectors, and the positional sensor acceleration data (computed from the positional data gathered from the positional sensor 405) can be represented as a second set of vectors. The positional sensor acceleration data and the transformed inertial data represent different measurements of the same object motion. Therefore, the positional sensor acceleration data and the transformed inertial data include a matched set of vectors, in which each vector in the first set of vectors corresponds to a vector in the second set of vectors. Corresponding vectors have the same origin and the same magnitude. Accordingly, the transformed inertial data can be compared with the positional sensor acceleration data to determine an amount of error in the angle (if the two data sets match, then the rotation estimate was accurate and the angle does not have an error to correct).

In one embodiment of the invention, to determine the amount of error for an angle due to drifting (e.g., yaw, pitch, or roll), the positional sensor acceleration data is transformed by rotating vectors of the positional sensor acceleration data by multiple potential angles and the transformation is compared with the transformed inertial data vectors. Many different combinations of potential angles may be tried. The combination of a potential angle that yields the smallest difference between the rotated vectors of the positional sensor acceleration and the transformed inertial data vectors is the estimated correct angle. The estimated amount of error is the difference between the angle estimated from integrating angular rate measurements from the inertial sensor(s) 420 (the inertial data) and the estimated correct angle. A gradient descent technique, partial least squares technique, least squares fit technique, or other error minimization technique may be used to minimize the number of combinations of potential angles that are tested to find the estimated correct angle.

For example, each vector $v_i$ that comprises object motion is represented in the first set of vectors as $v_{i1}$ (the positional sensor acceleration data vectors) and in the second set of vectors as $v_{i2}$ (the transformed inertial data vectors). For all vectors $v_{i1}$ in the first set of vectors, the vector $v_{i1}$ is transformed by a three dimensional rotation that is based on the potential angles, ending up with a transformed vector $v_{i1}'$. A difference $D_\theta$ is then found between $v_{i1}'$ and $v_{i2}$ for each vector $v_i$. The sum of the differences between the rotated vectors $v_{i1}'$ of the first set of vectors and the matching vectors $v_{i2}$ of the second set of vectors is then calculated using the following equation:

$$D_\theta = \sum_{i=1}^{n} (V_{i1}' - V_{i2}) \quad \text{(equation 4)}$$

The angle $\theta$ that yields the smallest $D_\theta$ is the correct estimated three dimensional angle. Therefore, the potential angle that makes up the three dimensional angle $\theta$ represents the estimated correct angle. The estimated amount of error may be determined by the difference between the angle estimated from integrating angular rate measurements from the inertial sensor(s) 410 (the inertial data) and the estimated correct angle. Although it has been described that the positional sensor acceleration data vectors are transformed and compared with the transformed inertial data vectors, it should be understood that it does not matter which set of vectors is rotated since the angle between the two sets of the vectors is the same regardless of which set is rotated.

In another embodiment of the invention, to determine the amount of error for an angle due to drifting (e.g., yaw, pitch, or roll), a three dimensional rotation is computed that aligns the coordinate system of the transformed inertial data and the positional sensor acceleration data. A three dimensional rotation can be defined by an axis and an angle. The rotation axis $\hat{e}$ for the three dimensional rotation can be solved for by taking the cross product of vectors of the first set of vectors $V_{i1}$ with vectors of the second set of vectors $V_{i2}$, as follows:

$$\hat{e} = V_{i1} \times V_{i2} \quad \text{(equation 5)}$$

The dot product of $V_{i1}$ and $V_{i2}$ can also be taken to find a scaler s that represents the projection of $V_{i1}$ onto $V_{i2}$, as follows:

$$s = V_{i1} \cdot V_{i2} \quad \text{(equation 6)}$$

The angle of the three dimensional rotation $\theta$ can then be solved for using the rotation axis and the scalar as follows:

$$\theta = \arctan\frac{|\hat{e}|}{r} = \arctan\frac{|V_{i1} \times V_{i2}|}{V_{i1} \cdot V_{i2}} \quad \text{(equation 7)}$$

The three dimensional rotation may then be decomposed into either of the reference frames to determine the angles of rotation about each of the axes of that reference frame. For example, the three dimensional rotation can be projected onto the x-axis to determine the amount of rotation that is occurring about the x-axis, and can be projected onto the y-axis to determine the amount of rotation that is occurring about the y-axis. If the three dimensional angle is projected into the object reference frame, the rotation about the axis that is aligned with gravity is the yaw, and the rotation about the axis that is perpendicular to gravity and in the positional sensor plane of the positional sensor is the pitch. The three dimensional rotation can be decomposed into rotations about the axes of the reference frames using, for example, three orthogonal matrices, a rotation matrix or a quaternion.

Quaternions form a four dimensional normed division algebra over the real numbers. Quaternions provide a useful representation of coordinate transformations because they can be computed faster than matrix transformations, and never lose their orthogonality. A quaternion representation of a rotation is written as a four dimensional vector:

$$q = [q_1 q_2 q_3 q_4]^T \quad \text{(equation 8)}$$

In terms of the world reference frame, the quaternion's elements are expressed as follows:

$$q_1 = \frac{\hat{e}_x \sin\left(\frac{\theta}{2}\right)}{|v_{i1} \times v_{i2}|} \quad \text{(equation 9)}$$

$$q_2 = \frac{\hat{e}_y \sin\left(\frac{\theta}{2}\right)}{|v_{i1} \times v_{i2}|} \quad \text{(equation 10)}$$

$$q_3 = \frac{\hat{e}_z \sin\left(\frac{\theta}{2}\right)}{|v_{i1} \times v_{i2}|} \quad \text{(equation 11)}$$

$$q_4 = \cos\left(\frac{\theta}{2}\right) \quad \text{(equation 12)}$$

Where $\hat{e}_x$, $\hat{e}_y$, and $\hat{e}_z$ represent the unit vectors represent the unit vectors along the x, y and z axes of the object reference frame, respectively.

The quaternion fully represents both the yaw and pitch rotations that are necessary to align the reference frames. However, to provide a more intuitive result, the quaternion may be converted to Euler angles of pitch and yaw according to the following formulas:

$$\text{yaw} = \arctan\frac{2(q_4 q_2 + q_3 q_1)}{1 - 2(q_1^2 + q_2^2)} \quad \text{(equation 13)}$$

$$\text{pitch} = \arcsin(2(q_4 q_1 - q_2 q_3)) \quad \text{(equation 14)}$$

The decomposed angle corresponds to the estimated correct angle. The estimated amount of error can be determined by calculating the difference between the angle estimated from integrating angular rate measurements from the inertial sensor(s) 410) (the inertial data) and the estimated correct angle.

In another embodiment of the invention, the sets of vectors may be projected onto a plane and a computation performed to compute a two-dimensional angle. For example, the positional sensor acceleration data vectors ($v_{i1}$) and the transformed inertial data vectors ($v_{i2}$) are projected onto a plane and the rotation is computed around the plane's normal which aligns the two sets of vectors in the plane. For example, for yaw angle correction, the transformed inertial data vectors (the acceleration data vectors) and the positional sensor acceleration data vectors are projected onto the XZ plane, and a rotation is found around the Y axis. Typically, this computation may be performed when at least one angle is known. For example, typically the pitch of the positional sensor 405 is known from an initial calibration of the tracking system (that is, the positional sensor 405 is typically fixed). The following equations may be used to project the positional sensor acceleration data vectors ($v_{i1}$) and the transformed inertial data vectors ($v_{i2}$) onto the plane, given the plane's unit-length normal vector $\hat{g}$:

$$\text{projected vector } (v_{i1}') = v_{i1} - \hat{g}(v_{i1} \cdot \hat{g}) \quad \text{(equation 15)}$$

$$\text{projected vector } (v_{i2}') = v_{i2} - \hat{g}(v_{i2} \cdot \hat{g}) \quad \text{(equation 16)}$$

The projected vectors are then rotated about the plane's normal. For example, the equations 9, 10, and 11 may be used to rotate the projected vectors around the x, y, and z axes respectively. The projected vectors are then compared to determine an estimated correct angle. The amount of error in the angle is computed based on the difference between the estimated correct angle and the angle computed from integration of the inertial data.

After the estimated error is determined, a correction is made to the rotation estimate. According to one embodiment of the invention, the correction amount is a portion of the estimated error (e.g., a percentage of the estimated error). Thus, the rotation estimate used to transform the acceleration received from the sensor(s) 420 of the object 410 from the frame of reference of the object 410 to the frame of reference of the positional sensor 405 is updated according to the correction amount.

According to one embodiment of the invention, the correction amount is a function of an amount of time that has passed since a previous correction. Thus, in one embodiment of the invention, the more time elapsed since the last correction the greater the amount of correction. For instance, if a user has not moved the object 410 (e.g., if the user has placed the controller coupled with the object 410 down) for a certain amount of time (e.g., 5-10 minutes), a considerable amount of drift may have occurred. In this case, the amount of correction may be a large percentage of the estimated error, or even the full percentage of the estimated error. According to one embodiment of the invention, if the user has not moved the object 410 for a certain amount of time, the user will be locked from using the object 410 in the tracking system until the user moves the object 410 in a motion path that gives a minimum threshold of acceleration and positional data. In one embodiment of the invention, the object 410 emits a certain color of light and/or sound when a user needs to move the object 410 to produce a minimum threshold of acceleration and positional data.

In another embodiment of the invention, the amount of correction is a function on the magnitude of the vector sets. For example, as described previously, in one embodiment of the invention, the vectors are weighted (the larger the magnitude of a vector the larger the weight). The larger the weight of the vectors, the larger the amount of correction. Of course, it should be understood that any combination of the above embodiments may be used (e.g., a percentage of the estimated error, a function of amount of time that has passed, and/or a function on the weights associated with the magnitude of the vectors).

Figure 5:
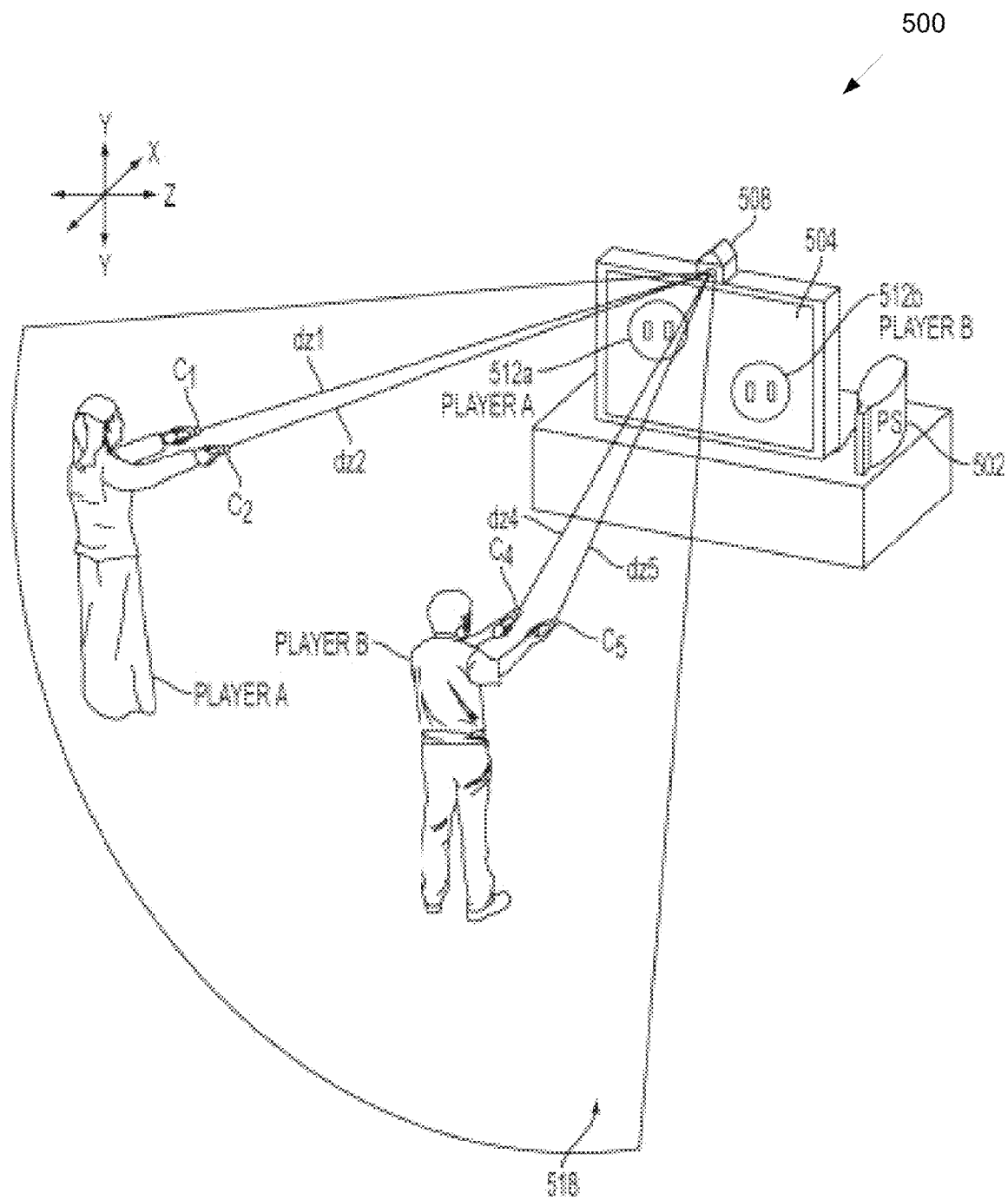
FIG. 5 shows a schematic diagram of a multiplayer environment, according to one embodiment of the present invention.

FIG. 5 shows a schematic diagram of a multiplayer environment 500, in which visual information is used to determine the locations of different controllers held by players, according to one embodiment. In the multiplayer environment 500, positional sensor 508 (illustrated and described below as a camera) obtains image data of a playing field 518, and the image data is analyzed to obtain the location of ball-attached controllers $C_1$, $C_2$, $C_4$ and $C_5$. Distances $d_{z1}$, $d_{z2}$, $d_{z4}$, and $d_{z5}$ are estimated by analyzing the shape and size of the respective balls in the captured image. A computing device 502 uses the obtained coordinates and distances to produce representations of the players in screen 504, avatars 512a and 512b respectively. A typical distance for good image recognition is about 10 ft (3 mtr). One advantage of using visual recognition is that improvements in image capture and image recognition can be included in the system without having to change the controller.

Figure 6:
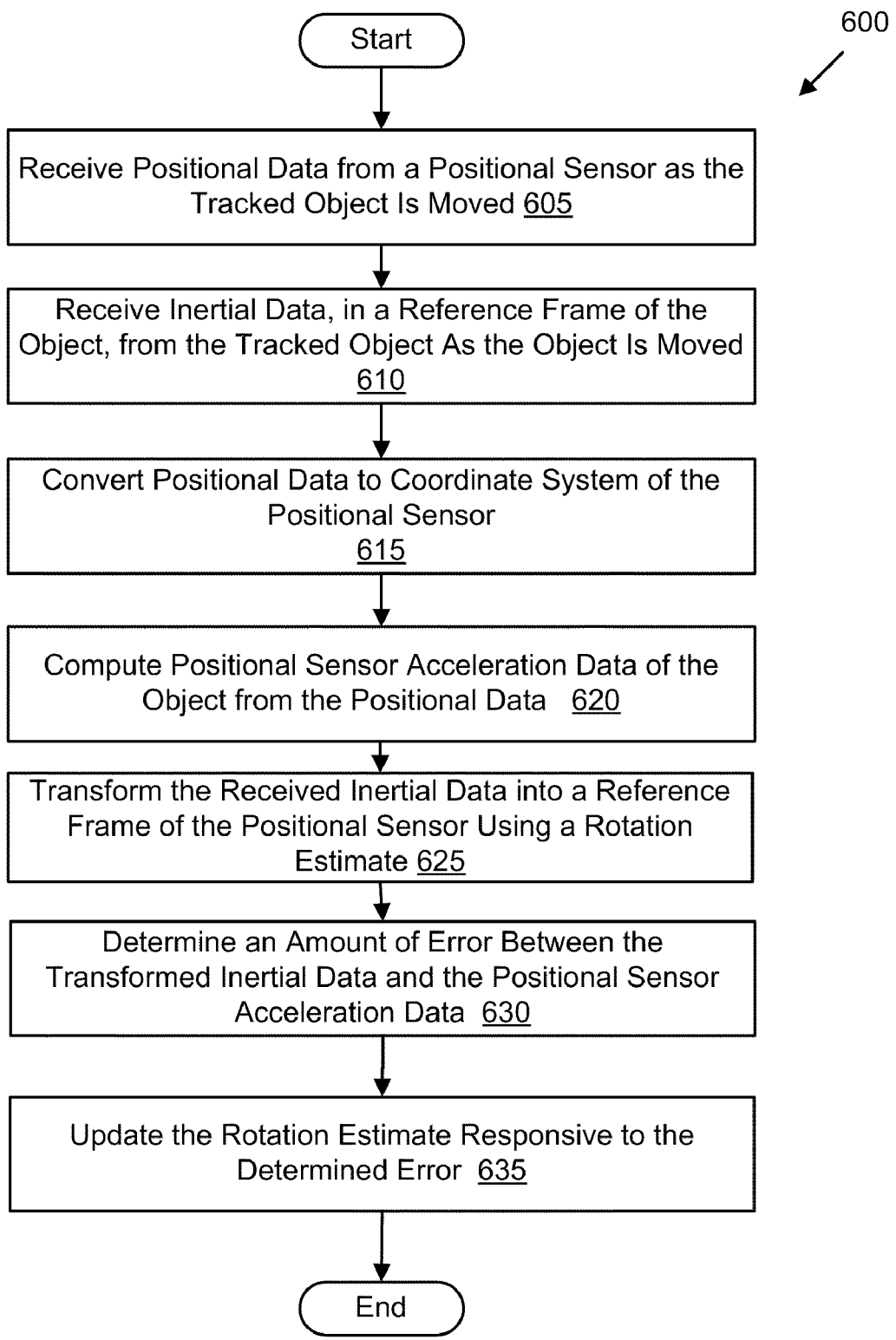
FIG. 6 is a flow diagram illustrating an exemplary method of compensating for angle error in a tracking system according to one embodiment of the invention.

FIG. 6 is a flow diagram illustrating an exemplary method 600 of compensating for angle error in a tracking system according to one embodiment of the invention. The method may be performed by processing logic that may comprise hardware (e.g., circuitry, dedicated logic, programmable logic, microcode, etc.), software (such as instructions run on a processing device), or a combination thereof. In one embodiment, method 600 is performed by computing device 415 of FIG. 4.

Referring to FIG. 6, at block 605 the computing device 415 receives positional data from the positional sensor 405 as the tracked object 410 is moved. In one embodiment of the invention, the computing device receives images of the object in a two-dimensional reference frame of the imaging device. Flow moves from block 605 to block 610

At block 610, the computing device 415 receives inertial data (e.g., via the inertial sensor(s) 420) from the tracked object 410 as the tracked object is moved. The inertial data is in a reference frame of the object 410. Flow moves from block 610 to block 615. At block 615, the computing device 415 converts the positional data to a coordinate system of the positional sensor 405. Flow moves from block 615 to block 620, where the computing device 415 computes positional sensor acceleration data of the object 410 from the positional data. For example, the computing device 415 may take a second derivative of the positional data with respect to time to compute the positional sensor acceleration data of the object 410. In one embodiment of the invention, the positional sensor acceleration data is computed in real time as the positional sensor data is received. Alternatively, the positional sensor acceleration data may be computed periodically (e.g., every 10 milliseconds, every half second, etc.), or when the motion is completed. Flow moves from block 620 to block 625.

At block 625, the computing device 415 transforms the received inertial data into a reference frame of the positional sensor using a rotation estimate. According to one embodiment of the invention, the rotation estimate is based on the previously determined value of the angle. For example, the first time the error correction process is performed, the rotation estimate is based on the initial value for the angle (e.g., determined during a configuration of the tracking system). Flow moves from block 625 to block 630.

Figure 7:
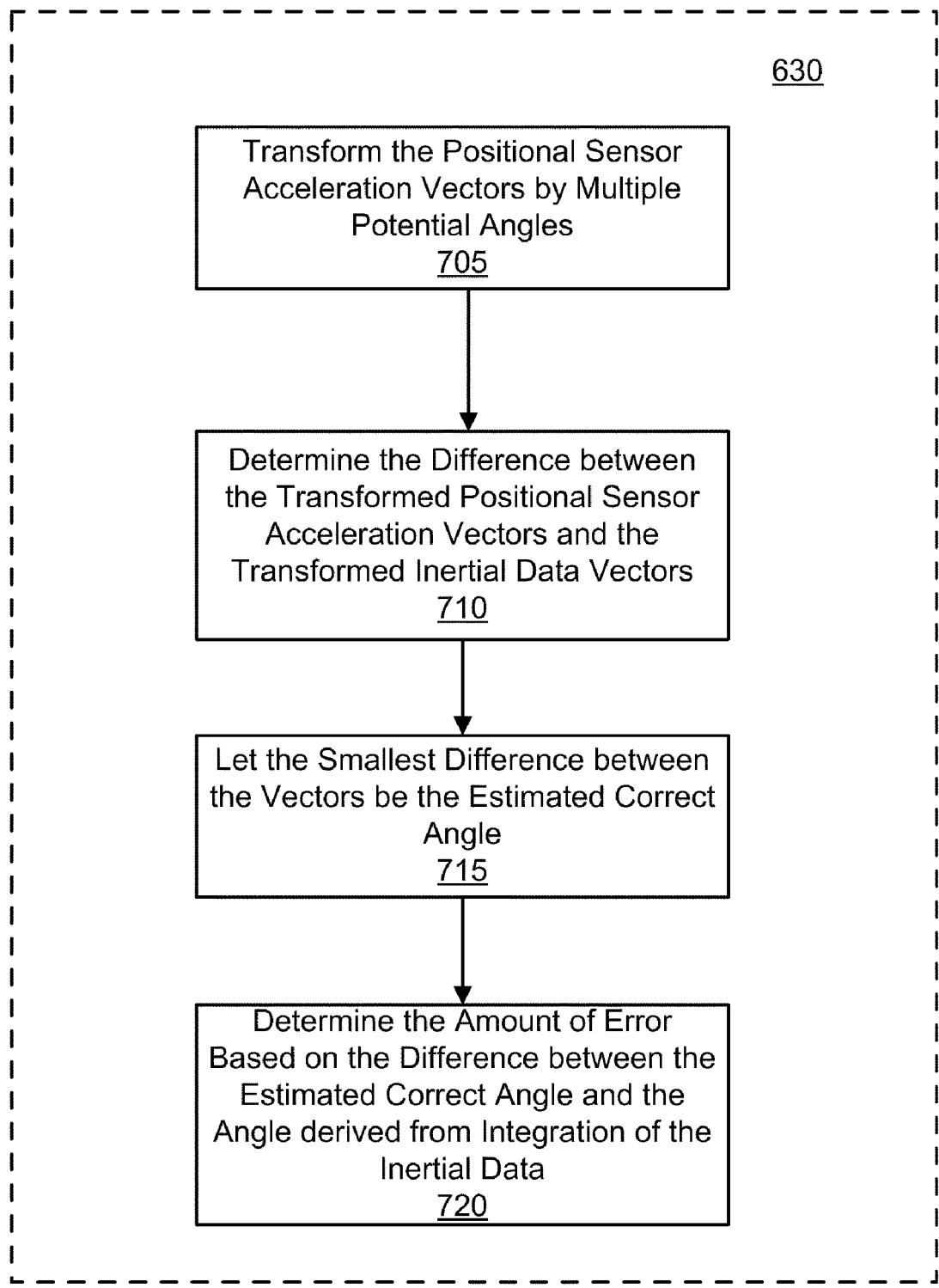
FIG. 7 is a flow diagram illustrating one method of determining an amount of error between the transformed inertial data and the positional sensor acceleration data according to one embodiment of the invention.

At block 630, the computing device 415 determines an amount of error between the transformed inertial data and the positional sensor acceleration data. FIG. 7 is a flow diagram illustrating one method of determining an amount of error between the transformed inertial data and the positional sensor acceleration data according to one embodiment of the invention. Thus, the operations of FIG. 7 are performed within the block 630 according to one embodiment of the invention. At block 705, the computing device 415 transforms the positional sensor acceleration vectors by multiple potential angles. Flow moves from block 705 to block 710, where the computing device 415 determines the difference between the transformed positional sensor acceleration vectors and the transformed inertial data vectors. Flow moves from block 710 to block 715, where the computing device 415 sets the smallest difference between the vectors to be the estimated correct angle. Flow moves from block 715 to block 720 where the computing device 415 determines the amount of error in the angle based on the difference between the estimated correct angle and the angle derived from integrating angular rate measurements from the inertial sensor(s) 420 (the inertial data).

Figure 8:
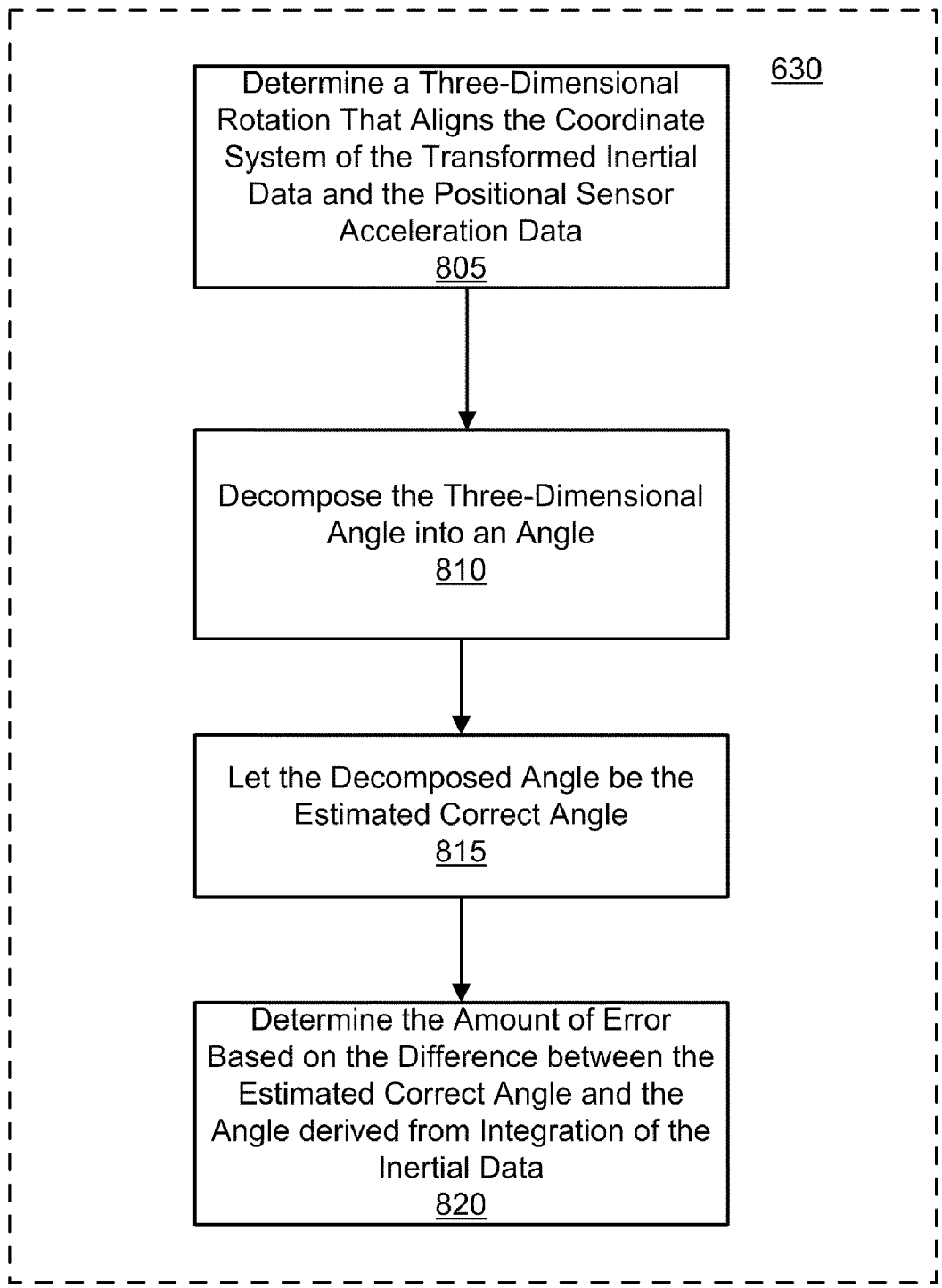
FIG. 8 is a flow diagram illustrating another method of determining an amount of error between the transformed inertial data and the positional sensor acceleration data according to one embodiment of the invention.

FIG. 8 is a flow diagram illustrating another method of determining an amount of error between the transformed inertial data and the positional sensor acceleration data according to one embodiment of the invention. Thus, the operations of FIG. 8 are performed within the block 630 according to one embodiment of the invention. At block 805, the computing device 415 determines a three-dimensional rotation that aligns the coordinate system of the transformed inertial data and the positional sensor acceleration data. Flow moves from block 805 to block 810, where the computing device 415 decomposes the three-dimensional angle into the angle which is being corrected. Flow moves from block 810 to block 815, where the computing device 415 sets the decomposed angle to be the estimated correct angle. Flow moves from block 815 to block 820 where the computing device 415 determines the amount of error in the angle based on the difference between the estimated correct angle and the angle derived from integrating angular rate measurements from the inertial sensor(s) 420 (the inertial data).

Figure 9:
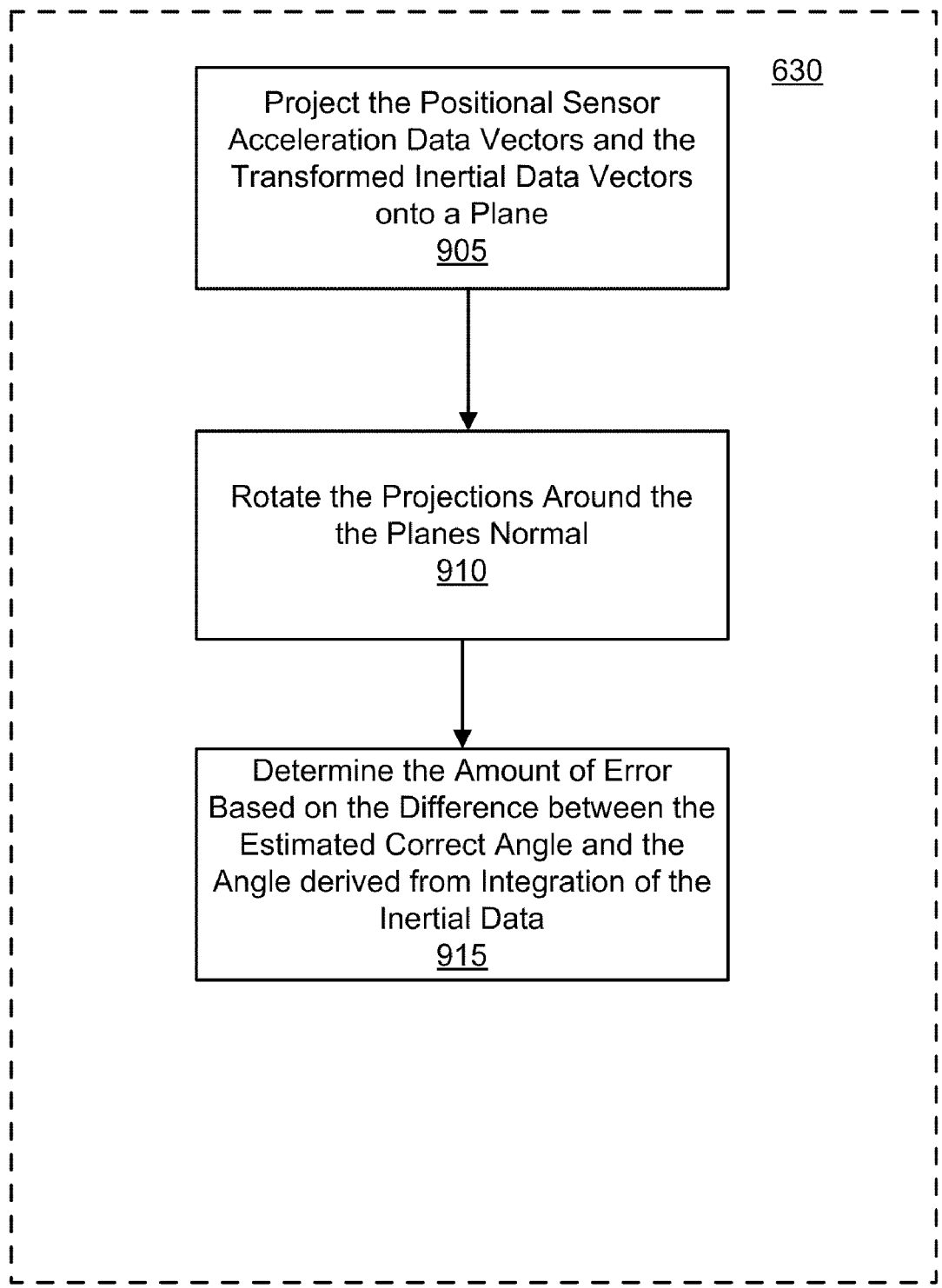
FIG. 9 is a flow diagram illustrating another method of determining an amount of error between the transformed inertial data and the positional sensor acceleration data according to one embodiment of the invention.

FIG. 9 is a flow diagram illustrating yet another method of determining an amount of error between the transformed inertial data and the positional sensor acceleration data according to one embodiment of the invention. Thus, the operations of FIG. 9 are performed within the block 630 according to one embodiment of the invention. At block 905, the computing device 415 projects the positional sensor acceleration data vectors and the transformed inertial data vectors onto the same two-dimensional plane (e.g., using the equations 15 and 16 described above). Flow moves from block 905 to block 910, where the computing device 415 rotates the projections around the plane's normal (e.g., using one of the equations 9, 10, or 11 described above). Flow moves from block 910 to block 915, where the computing device 415 determines the amount of error in the angle based on the difference between the estimated correct angle and the angle computed from integration of the inertial data.

Referring back to FIG. 6, flow moves from block 630 to block 635. At block 635, the computing device 415 updates the rotation estimate responsive to the determined error. Thus, the rotation estimate used to transform the received inertial data into a reference frame of the positional sensor as described in block 625 is updated responsive to the determined amount of error. According to one embodiment of the invention, the amount the rotation estimate is updated is a portion of the estimated error (e.g., a percentage of the determined estimated error).

According to one embodiment of the invention, the correction amount is a function of an amount of time that has passed since a previous rotation estimate update. Thus, in one embodiment of the invention, the more time elapsed since the last update the greater the amount of correction. For instance, if a user has not moved the object 410 (e.g., if the user has placed the controller coupled with the object 410 down) for a certain amount of time (e.g., 5-10 minutes), a considerable amount of drift may have occurred. In this case, the amount of correction may be a large percentage of the estimated error, or even the full percentage of the estimated error. According to one embodiment of the invention, if the user has not moved the object 410 for a certain amount of time, the user will be locked from using the object 410 in the tracking system until the user moves the object 410 in a motion path that gives a minimum threshold of acceleration and positional data. In one embodiment of the invention, the object 410 emits a certain color of light and/or sound when a user needs to move the object 410 to produce a minimum threshold of acceleration and positional data.

In another embodiment of the invention, the amount of correction is a function on the magnitude of the vector sets. For example, as described previously, in one embodiment of the invention, the vectors are weighted (the larger the magnitude of a vector the larger the weight). The greater the magnitude of a vector, the less the vector is influenced by noise. The larger the weight of the vectors, the larger the amount of correction. Thus, the accuracy of the estimated error increases by weighting the vectors. Of course, it should be understood that any combination of the above embodiments may be used (e.g., a percentage of the estimated error, a function of amount of time that has passed, and/or a function on the weights associated with the magnitude of the vectors).

Figure 10:
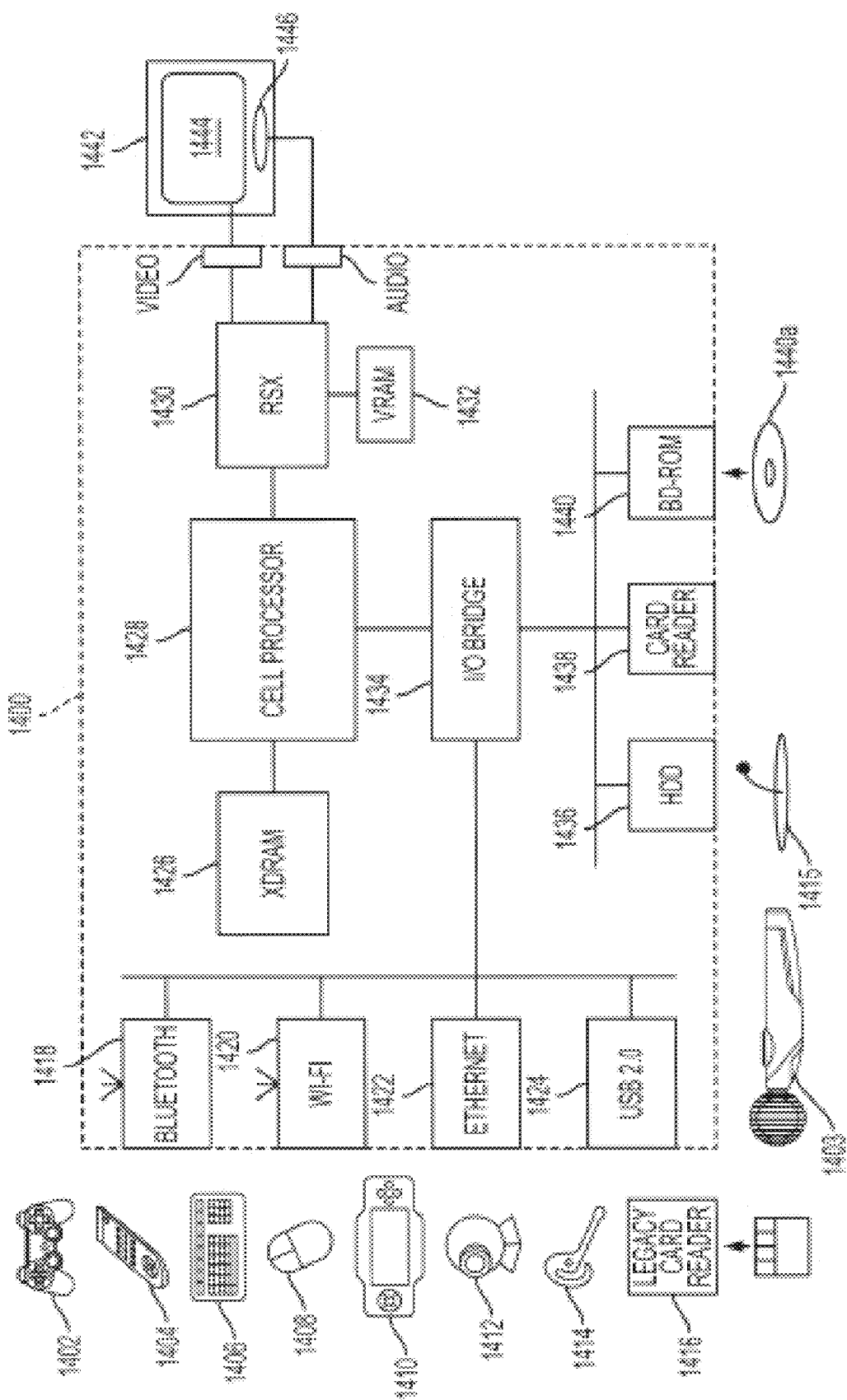
FIG. 10 illustrates hardware and user interfaces that may be used to determine controller location, in accordance with one embodiment of the present invention.

FIG. 10 illustrates hardware and user interfaces that may be used to determine controller location, in accordance with one embodiment of the present invention. FIG. 10 schematically illustrates the overall system architecture of the Sony® Playstation 3® entertainment device, a console that may be compatible for implementing a three-dimensional controller locating system in accordance with one embodiment of the present invention. A system unit 1400 is provided, with various peripheral devices connectable to the system unit 1400. The system unit 1400 comprises: a Cell processor 1428; a Rambus® dynamic random access memory (XDRAM) unit 1426; a Reality Synthesizer graphics unit 1430 with a dedicated video random access memory (VRAM) unit 1432; and an I/O bridge 1434. The system unit 1400 also comprises a Blu Ray® Disk BD-ROM® optical disk reader 1440 for reading from a disk 1440a and a removable slot-in hard disk drive (HDD) 1436, accessible through the I/O bridge 1434. Optionally the system unit 1400 also comprises a memory card reader 1438 for reading compact flash memory cards, Memory Stick® memory cards and the like, which is similarly accessible through the I/O bridge 1434.

The I/O bridge 1434 also connects to multiple Universal Serial Bus (USB) 2.0 ports 1424; a gigabit Ethernet port 1422; an IEEE 802.11b/g wireless network (Wi-Fi) port 1420; and a Bluetooth® wireless link port 1418 capable of supporting of up to seven Bluetooth connections.

In operation, the I/O bridge 1434 handles all wireless, USB and Ethernet data, including data from one or more game controllers 1402-1403. For example when a user is playing a game, the I/O bridge 1434 receives data from the game controller 1402-1403 via a Bluetooth link and directs it to the Cell processor 1428, which updates the current state of the game accordingly.

The wireless, USB and Ethernet ports also provide connectivity for other peripheral devices in addition to game controllers 1402-1403, such as: a remote control 1404; a keyboard 1406; a mouse 1408; a portable entertainment device 1410 such as a Sony Playstation Portable® entertainment device; a video camera such as an EyeToy® video camera 1412; a microphone headset 1414; and a microphone 1415. Such peripheral devices may therefore in principle be connected to the system unit 1400 wirelessly; for example the portable entertainment device 1410 may communicate via a Wi-Fi ad-hoc connection, whilst the microphone headset 1414 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 1416 may be connected to the system unit via a USB port 1424, enabling the reading of memory cards 1448 of the kind used by the Playstation® or Playstation 2® devices.

The game controllers 1402-1403 are operable to communicate wirelessly with the system unit 1400 via the Bluetooth link, or to be connected to a USB port, thereby also providing power by which to charge the battery of the game controllers 1402-1403. Game controllers 1402-1403 can also include memory, a processor, a memory card reader, permanent memory such as flash memory, light emitters such as LEDs or infrared lights, microphone and speaker for ultrasound communications, an acoustic chamber, a digital camera, an internal clock, a recognizable shape such as a spherical section facing the game console, and wireless communications using protocols such as Bluetooth®, WiFi™, etc.

Game controller 1402 is a controller designed to be used with two hands, and game controller 1403 is a single-hand controller with a ball attachment, as previously described in FIGS. 1A-4A. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1404 is also operable to communicate wirelessly with the system unit 1400 via a Bluetooth link. The remote control 1404 comprises controls suitable for the operation of the Blu Ray™ Disk BD-ROM reader 1440 and for the navigation of disk content.

The Blu Ray™ Disk BD-ROM reader 1440 is operable to read CD-ROMs compatible with the Playstation and PlayStation 2 devices, in addition to conventional pre-recorded and recordable CDs, and so-called Super Audio CDs. The reader 1440 is also operable to read DVD-ROMs compatible with the Playstation 2 and PlayStation 3 devices, in addition to conventional pre-recorded and recordable DVDs. The reader 1440 is further operable to read BD-ROMs compatible with the Playstation 3 device, as well as conventional pre-recorded and recordable Blu-Ray Disks.

The system unit 1400 is operable to supply audio and video, either generated or decoded by the Playstation 3 device via the Reality Synthesizer graphics unit 1430, through audio and video connectors to a display and sound output device 1442 such as a monitor or television set having a display 1444 and one or more loudspeakers 1446. The audio connectors 1450 may include conventional analogue and digital outputs whilst the video connectors 1452 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1428. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1412 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1400. The camera LED indicator is arranged to illuminate in response to appropriate control data from the system unit 1400, for example to signify adverse lighting conditions. Embodiments of the video camera 1412 may variously connect to the system unit 1400 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 1400, an appropriate piece of software such as a device driver should be provided. Device driver technology is well-known and will not be described in detail here, except to say that the skilled man will be aware that a device driver or similar software interface may be required in the present embodiment described.

Figure 11:
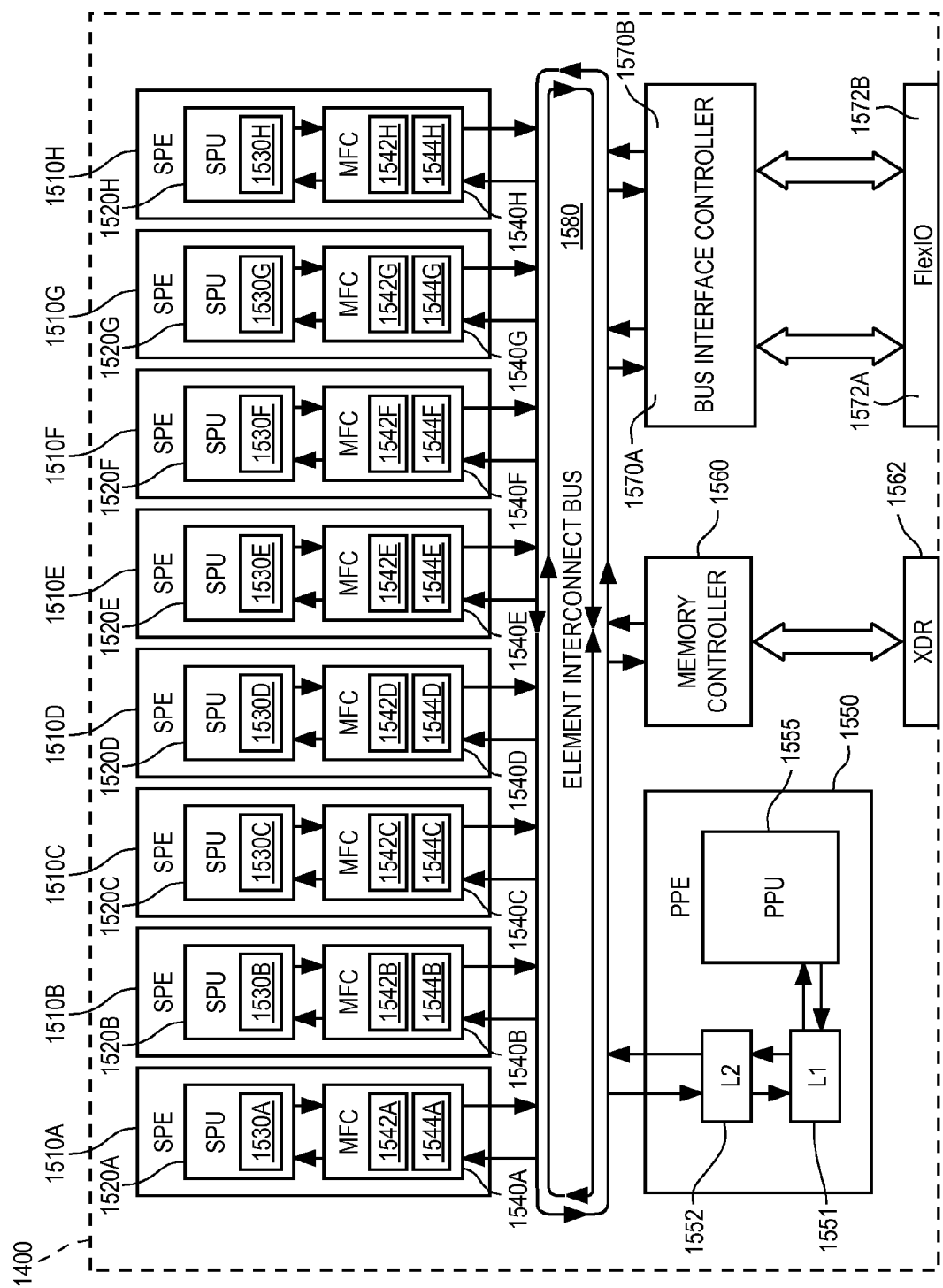
FIG. 11 illustrates additional hardware that may be used to process instructions, in accordance with one embodiment of the present invention.

FIG. 11 illustrates additional hardware that may be used to process instructions, in accordance with one embodiment of the present invention. Cell processor 1428 of FIG. 10 has an architecture comprising four basic components: external input and output structures comprising a memory controller 1560 and a dual bus interface controller 1570A, B; a main processor referred to as the Power Processing Element 1550; eight co-processors referred to as Synergistic Processing Elements (SPEs) 1510A-H; and a circular data bus connecting the above components referred to as the Element Interconnect Bus 1580. The total floating point performance of the Cell processor is 218 GFLOPS, compared with the 6.2 GFLOPs of the Playstation 2 device's Emotion Engine.

The Power Processing Element (PPE) 1550 is based upon a two-way simultaneous multithreading Power 1470 compliant PowerPC core (PPU) 1555 running with an internal clock of 3.2 GHz. It comprises a 512 kB level 2 (L2) cache and a 32 kB level 1 (L1) cache. The PPE 1550 is capable of eight single position operations per clock cycle, translating to 25.6 GFLOPs at 3.2 GHz. The primary role of the PPE 1550 is to act as a controller for the Synergistic Processing Elements 1510A-H, which handle most of the computational workload. In operation the PPE 1550 maintains a job queue, scheduling jobs for the Synergistic Processing Elements 1510A-H and monitoring their progress. Consequently each Synergistic Processing Element 1510A-H runs a kernel whose role is to fetch a job, execute it and synchronized with the PPE 1550.

Each Synergistic Processing Element (SPE) 1510A-H comprises a respective Synergistic Processing Unit (SPU) 1520A-H, and a respective Memory Flow Controller (MFC) 1540A-H comprising in turn a respective Dynamic Memory Access Controller (DMAC) 1542A-H, a respective Memory Management Unit (MMU) 1544A-H and a bus interface (not shown). Each SPU 1520A-H is a RISC processor clocked at 3.2 GHz and comprising 256 kB local RAM 1530A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 1520A-H does not directly access the system memory XDRAM 1426; the 64-bit addresses formed by the SPU 1520A-H are passed to the MFC 1540A-H which instructs its DMA controller 1542A-H to access memory via the Element Interconnect Bus 1580 and the memory controller 1560.

The Element Interconnect Bus (EIB) 1580 is a logically circular communication bus internal to the Cell processor 1428 which connects the above processor elements, namely the PPE 1550, the memory controller 1560, the dual bus interface 1570A,B and the 8 SPEs 1510A-H, totaling 12 participants. Participants can simultaneously read and write to the bus at a rate of 8 bytes per clock cycle. As noted previously, each SPE 1510A-H comprises a DMAC 1542A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96 B per clock, in the event of full utilization through arbitration between participants. This equates to a theoretical peak bandwidth of 307.2 GB/s (gigabytes per second) at a clock rate of 3.2 GHz.

The memory controller 1560 comprises an XDRAM interface 1562, developed by Rambus Incorporated. The memory controller interfaces with the Rambus XDRAM 1426 with a theoretical peak bandwidth of 25.6 GB/s.

The dual bus interface 1570A,B comprises a Rambus FlexIO® system interface 1572A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 1428 to the Reality Simulator graphics unit 1430 will typically comprise display lists, being a sequence of commands to draw vertices, apply textures to polygons, specify lighting conditions, and so on.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While embodiments of the invention have been described with reference to correcting a single angle error (e.g., yaw, pitch, or roll), it should be understood that in other embodiments of the invention multiple angle errors may be corrected simultaneously.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method to compensate for error of a rotation angle when tracking an object, comprising:
   receiving inertial data corresponding to the tracked object in a reference frame of the object;
   transforming the inertial data into a reference frame of a positional sensor using a rotation estimate;
   determining an amount of error between the transformed inertial data and acceleration data derived from positional data received from the positional sensor; and
   updating the rotation estimate responsive to the determined error.

2. The method of claim 1, wherein the positional sensor is one of a digital camera, a z-camera, an ultrasonic sensor, or a photosonic sensor.

3. The method of claim 1, wherein the object is a sphere coupled with a game controller, wherein the position of the sphere relative to the positional sensor controls associations associated with a video game.

4. The method of claim 1, wherein updating the rotation estimate comprises updating the rotation estimate based on a portion of the determined error.

5. The method of claim 1, wherein updating the rotation estimate comprises updating the rotation estimate based on an amount of time lapsed since a previous update of the rotation estimate.

6. The method of claim 1, wherein the received inertial data includes acceleration data of the tracked object, wherein the acceleration data of the tracked object includes a first plurality of vectors and the acceleration data derived from positional data includes a second plurality of vectors.

7. The method of claim 6, further comprising:
   for each vector in the first plurality of vectors, filtering out the vector if it has a magnitude that is smaller than a minimum threshold.

8. The method of claim 6, further comprising:
   for each vector in the first plurality of vectors, applying a weight for the vector based on a magnitude of the vector, wherein vectors having a higher magnitude are weighted more heavily than vectors having a lower magnitude.

9. The method of claim 6, wherein the determining the amount of error comprises:
   selecting a plurality of potential angles;
   rotating the second plurality of vectors by each of the plurality of potential angles;

determining a difference between the rotated vectors and the first plurality of vectors for each of the plurality of potential angles;

identifying which one of the plurality of potential angles causes the smallest difference between the rotated vectors and the first plurality of vectors;

setting the identified angle as the estimated correct angle; and determining an estimated amount of error based on the difference between the estimated correct angle and the rotation angle.

10. The method of claim 6, wherein determining the amount of error comprises:

determining a three-dimensional rotation that aligns the first plurality of vectors and the second plurality of vectors, the three-dimensional rotation including a three-dimensional angle between the first plurality of vectors and the second plurality of vectors;

decomposing the three-dimensional angle into a decomposed angle, the decomposed angle being a same type of angle as the rotation angle;

setting the decomposed angle as the estimated correct angle; and determining an estimated amount of error based on the difference between the estimated correct angle and the rotation angle.

11. The method of claim 6, wherein determining the amount of error comprises:

projecting the first and second plurality of vectors onto a plane;

rotating the projections around a normal of the plane; and determining an estimated amount of error based on the difference between the rotated projections.

12. The method of claim 6, wherein updating the rotation estimate comprises basing an amount the rotation is updated on a magnitude of each of the first plurality of vectors.

13. A non-transitory machine-readable storage medium that provides instructions that, if executed by a processor, will cause said processor to perform operations to compensate for error of a rotation angle when tracking an object, the operations comprising:

receiving inertial data corresponding to the tracked object in a reference frame of the object;

transforming the inertial data into a reference frame of a positional sensor using a rotation estimate;

determining an amount of error between the transformed inertial data and acceleration data derived from positional data received from the positional sensor; and updating the rotation estimate responsive to the determined error.

14. The non-transitory machine-readable storage medium of claim 13, wherein the positional sensor is one of a digital camera, a z-camera, an ultrasonic sensor, or a photosonic sensor.

15. The non-transitory machine-readable storage medium of claim 13, wherein the object is a sphere coupled with a game controller, wherein the position of the sphere relative to the positional sensor controls associations associated with a video game.

16. The non-transitory machine-readable storage medium of claim 13, wherein updating the rotation estimate comprises updating the rotation estimate based on a portion of the determined error.

17. The non-transitory machine-readable storage medium of claim 13, wherein updating the rotation estimate comprises updating the rotation estimate based on an amount of time lapsed since a previous update of the rotation estimate.

18. The non-transitory machine-readable storage medium of claim 13, wherein the received inertial data includes acceleration data of the tracked object, wherein the acceleration data of the tracked object includes a first plurality of vectors and the acceleration data derived from positional data includes a second plurality of vectors.

19. The non-transitory machine-readable storage medium of claim 18, further comprising:

for each vector in the first plurality of vectors, filtering out the vector if it has a magnitude that is smaller than a minimum threshold.

20. The non-transitory machine-readable storage medium of claim 18, further comprising:

for each vector in the first plurality of vectors, applying a weight for the vector based on a magnitude of the vector, wherein vectors having a higher magnitude are weighted more heavily than vectors having a lower magnitude.

21. The non-transitory machine-readable storage medium of claim 18, wherein determining the amount of error comprises:

selecting a plurality of potential angles;

rotating the second plurality of vectors by each of the plurality of potential angles;

determining a difference between the rotated vectors and the first plurality of vectors for each of the plurality of potential angles;

identifying which one of the plurality of potential angles causes the smallest difference between the rotated vectors and the first plurality of vectors;

setting the identified angle as the estimated correct angle; and determining an estimated amount of error based on the difference between the estimated correct angle and the rotation angle.

22. The non-transitory machine-readable storage medium of claim 18, wherein determining the amount of error comprises:

determining a three-dimensional rotation that aligns the first plurality of vectors and the second plurality of vectors, the three-dimensional rotation including a three-dimensional angle between the first plurality of vectors and the second plurality of vectors;

decomposing the three-dimensional angle into a decomposed angle, the decomposed angle being a same type of angle as the rotation angle;

setting the decomposed angle as the estimated correct angle; and determining an estimated amount of error based on the difference between the estimated correct angle and the rotation angle.

23. The non-transitory machine-readable storage medium of claim 18, wherein determining the amount of error comprises:

projecting the first and second plurality of vectors onto a plane;

rotating the projections around a normal of the plane; and determining an estimated amount of error based on the difference between the rotated projections.

24. The non-transitory machine-readable storage medium of claim 18, wherein updating the rotation estimate comprises basing an amount the rotation is updated on a magnitude of each of the first plurality of vectors.

25. A tracking system, comprising:

a tracked object corresponding with one or more inertial sensors, the inertial sensors to gather inertial data as the tracked object is moved, wherein the inertial data is transmitted to a computing device;

a positional sensor to gather positional data of the tracked object as the object is moved, wherein the positional data is transmitted to the computing device; and a computing device having a processor to execute instructions and a memory, coupled with the processor, having instructions that when executed, cause the processor to perform operations including:

receiving the inertial data corresponding to the tracked object in a reference frame of the object;

transforming the inertial data into a reference frame of the positional sensor using a rotation estimate;

determining an amount of error between the transformed inertial data and acceleration data derived from the positional data received from the positional sensor; and updating the rotation estimate responsive to the determined error.

26. The tracking system of claim 25, wherein the positional sensor is one of a digital camera, a z-camera, an ultrasonic sensor, or a photosonic sensor.

27. The tracking system of claim 25, wherein the tracked object is a sphere coupled with a game controller, wherein the position of the sphere relative to the positional sensor controls associations associated with a video game being played on the computing device.

28. The tracking system of claim 25, wherein updating the rotation estimate comprises updating the rotation estimate based on a portion of the determined error.

29. The tracking system of claim 25, wherein updating the rotation estimate comprises updating the rotation estimate based on an amount of time lapsed since a previous update of the rotation estimate.

30. The tracking system of claim 25, wherein the received inertial data includes acceleration data of the tracked object, wherein the acceleration data of the tracked object includes a first plurality of vectors and the acceleration data derived from positional data includes a second plurality of vectors.

31. The tracking system of claim 30, further comprising:
for each vector in the first plurality of vectors, filtering out the vector if it has a magnitude that is smaller than a minimum threshold.

32. The tracking system of claim 30, further comprising:
for each vector in the first plurality of vectors, applying a weight for the vector based on a magnitude of the vector, wherein vectors having a higher magnitude are weighted more heavily than vectors having a lower magnitude.

33. The tracking system of claim 30, wherein determining the amount of error comprises:
selecting a plurality of potential angles;
rotating the second plurality of vectors by each of the plurality of potential angles;
determining a difference between the rotated vectors and the first plurality of vectors for each of the plurality of potential angles;
identifying which one of the plurality of potential angles causes the smallest difference between the rotated vectors and the first plurality of vectors;
setting the identified angle as the estimated correct angle; and
determining an estimated amount of error based on the difference between the estimated correct angle and the rotation angle.

34. The tracking system of claim 30, wherein determining the amount of error comprises:
determining a three-dimensional rotation that aligns the first plurality of vectors and the second plurality of vectors, the three-dimensional rotation including a three-dimensional angle between the first plurality of vectors and the second plurality of vectors;
decomposing the three-dimensional angle into a decomposed angle, the decomposed angle being a same type of angle as the rotation angle;
setting the decomposed angle as the estimated correct angle; and
determining an estimated amount of error based on the difference between the estimated correct angle and the rotation angle.

35. The tracking system of claim 30, wherein determining the amount of error comprises:
projecting the first and second plurality of vectors onto a plane;
rotating the projections around a normal of the plane; and
determining an estimated amount of error based on the difference between the rotated projections.

36. The tracking system of claim 30, wherein updating the rotation estimate comprises basing an amount the rotation is updated on a magnitude of each of the first plurality of vectors.

* * * * *